United States Patent [19]

Poetsch et al.

[11] Patent Number: 4,581,642
[45] Date of Patent: Apr. 8, 1986

[54] TELEVISON NOISE REDUCTION SYSTEM FOR A SIGNAL SOURCE HAVING VARIABLE PICTURE REPETITION

[75] Inventors: Dieter Poetsch, Ober-Ramstadt; Gerhard Illetschko, Darmstadt, both of Fed. Rep. of Germany

[73] Assignee: Robert Bosch GmbH, Stuttgart, Fed. Rep. of Germany

[21] Appl. No.: 532,103

[22] Filed: Sep. 14, 1983

[30] Foreign Application Priority Data

Sep. 15, 1982 [DE] Fed. Rep. of Germany ....... 3234178

[51] Int. Cl.⁴ .............................................. H04N 5/21
[52] U.S. Cl. ..................................... 358/167; 358/105
[58] Field of Search .................. 358/167, 166, 905, 36, 358/37, 105

[56] References Cited

U.S. PATENT DOCUMENTS

| | | | |
|---|---|---|---|
| 4,296,436 | 10/1981 | Achiha | 358/167 |
| 4,485,403 | 11/1984 | Illetschko | 358/167 |
| 4,500,911 | 2/1985 | Ninomiya | 358/36 |

Primary Examiner—Tommy P. Chin
Attorney, Agent, or Firm—Frishauf, Holtz, Goodman & Woodward

[57] ABSTRACT

The correction factor applied to a delayed television signal in a television noise reduction system and the complement of that factor applied to the undelayed television signal from which the delayed television signal is derived after averaging with the weighted delayed signal of an earlier of the preceding television frames, are modified in accordance with whether the source of the origninal television signals is or is not repeating at least one field of the television frames before going on to the next. The variation of the correction factor can also be made to depend on the number of repetitions of each frame. In an automatic system, operating in connection with a film scanner capable of scanning a motion picture film at different speeds (frames per second) to produce television signals in accordance with either the American or European television standard, the correction factor is set at the value 1 whenever a film frame is scanned for more than two half-frame television fields. For this purpose, a signal change from one state to another as soon as one full television frame has been provided by scanning a film frame. At the same time that the correction factor is set at the value 1, the writing-in of television signals into the store which produces the delayed television signal is blocked, so that the previously written-in signal, representing the same frame, is used, and the accumulation of correlated noise in the output signal is prevented.

6 Claims, 5 Drawing Figures a) FILM SPEED 25 FR./SEC.
TV TRANS. 625 LINES/FR. & 25 FR./SEC.

b) FILM SPEED 12.5 FR./SEC.
TV TRANS. 625 LINES/FR. & 25 FR./SEC.

c) FILM SPEED 24 FR./SEC.
TV TRANS 525 LINES/FR. & 30 FR./SEC.

TELEVISON NOISE REDUCTION SYSTEM FOR A SIGNAL SOURCE HAVING VARIABLE PICTURE REPETITION

This invention concerns a system for reduction of disturbance of a television picture signal by noise in which a correction factor applied to the signal, which is equivalent to a picture point value integration time constant, is variable in response to changes in the number of times a television frame is identically repeated in the picture source.

Systems for reducing noise in television signals are known, for example, from an article beginning at page 42 in the November 1980 issue of "Broadcast Engineering", in which television signals delayed for the period of one frame and then modified with a correction factor are added to the undelayed signal which has been also modified by a complement of the correction factor. The operation of this known system depends on the fact that differences from one television frame to the next are averaged out. This averaging, however, produces not only the desired noise reduction, but also a reduction of the sharpness of movement in the picture. It is therefore necessary to reduce the averaging effect when there is movement. For that purpose, so-called movement detectors are provided by which a distinction can be made between those differences in successive frames resulting from noise and those resulting from movement.

When such a system is used in connection with the operation of a picture signal source, such as, for example, magnetic tape recording and reproducing equipment or film scanners, or the like, which have provisions for changing the number of times that a television frame is identically repeated (sometimes referred to as a picture repetition rate, although strictly speaking the number is not a "rate"), usually for changing the motion rate in the picture to provide slow motion or accelerated motion, or even fast forward and backwards scanning of a tape, the measure of noise reduction would thereby also change. Noise reduction which reduces the uncorrelated disturbing signal (noise) is known to involve a degree of reduction that depends upon the correlation of the disturbing signals. For purely statistically distributed (uncorrelated) noise appearing from frame to frame, the noise reduction degree is the greatest. In the production of slow-motion effect, a single picture is identically reproduced several times. Signal content and disturbing voltages are unchanged (correlated noise) until the next picture frame appears, which is then likewise identically repeated several times. In consequence, the degree of noise reduction is reduced.

Furthermore, in picture reproduction, there is a sudden alternation of television pictures respectively containing correlated and uncorrelated noise because of repetition of temporarily stored pictures. This sudden change of the kind of noise leads to sudden change of the noise components when a noise-reduction system is used, an effect that is known as noise flicker (e.g., film grain flicker).

SUMMARY OF THE INVENTION

It is an object of the present invention to improve television noise-reduction systems for use with sources of picture signals in which the identical repetition of television frames in the output signals is variable, so that the degree of noise reduction is to a large extent independent of the frame repetition index.

Briefly, means are provided, connected to the source of picture signals, for producing a signal representative of the number of times a television frame is being identically repeated, and means are also provided responsive to that signal for setting the value of the correction factor, which corresponds to an effective time constant of integration of picture point values, in the operation of the noise-reduction system in the absence of detection of movement by the movement detectors. In the improved system, the correction factor value is increased with an increasing number of repetitions of a frame and decreased when there is a decreased number of repetitions per frame. It is practical to utilize a limited range of settings of the correction factor and even to provide for setting the correction factor value at 1 whenever there is repetition or when the number of repetitions exceeds a predetermined number. It is also useful to delay the setting of the correction value at 1 in such cases until the lapse of a frame interval after the storage of a frame for repetition in the source of picture signals.

The system of the invention has the advantage that the effective noise reduction is not reduced, but is maintained or even increased. There is the further advantage that neither noise flickering nor increased deterioration of picture detail compared to non-repetition (showing each television frame only once) takes place.

It is also advantageous to prevent the writing-in of another frame into the delay unit for repetition so long as the correction factor is maintained at the value 1, in order to prevent further error propagation by frequent recirculation of the picture signal.

BRIEF DESCRIPTION OF THE DRAWINGS

The invention is further described by way of illustrative example with reference to the annexed drawings, in which.

DESCRIPTION OF THE PREFERRED EMBODIMENTS

Figure 1:
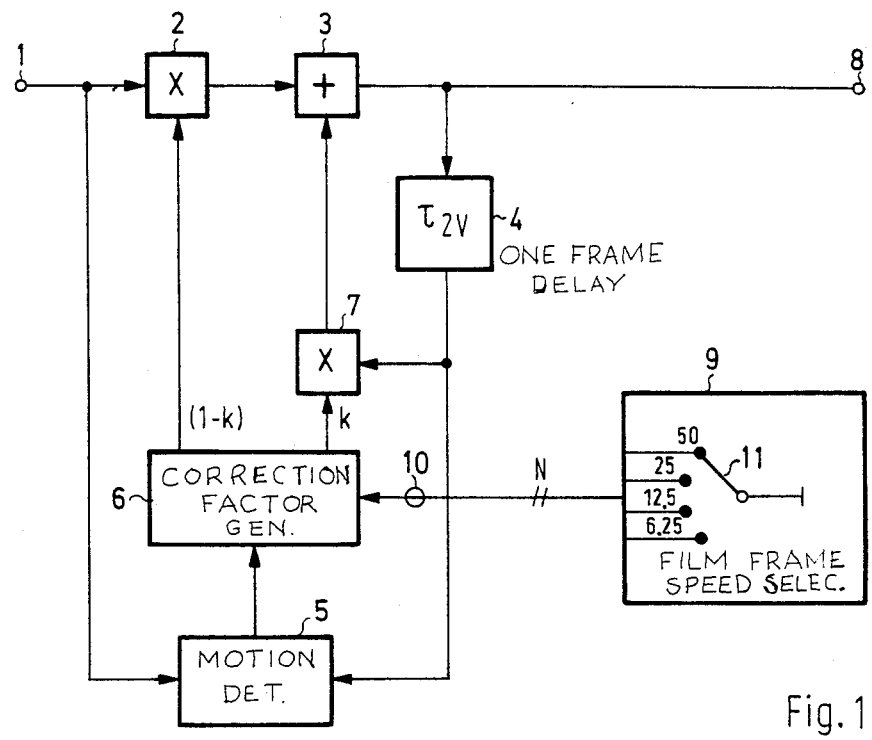
FIG. 1 is a block circuit diagram of a manually settable noise-reduction system in accordance with the invention.

In the circuit of FIG. 1, the television signal of which the noise components are to be reduced is supplied to the circuit of the terminal 1. It passes through the multiplication circuit 2 and the addition circuit 3 to a delay unit 4 which delays the television signal by the interval corresponding to one television frame made up in the usual way of two interlaced television fields (so that one television frame corresponds to two periods of the vertical scanning frequency). Such delay units are well known and are advantageously constituted as a digital frame store with its read-out following the write-in operation by one frame interval. The delayed signal at the output of the delay unit 4 is supplied to a so-called motion detector 5, to the other input of which the undelayed signal is supplied from the terminal 1. This motion detector 5 consists essentially of a subtraction circuit by means of which the difference between the undelayed and the delayed picture signals is produced. The output of the motion detector 5 is connected with one input of a circuit 6 which serves to generate a correction factor k for the degree of noise reduction.

The circuit 6 has two outputs, one providing the correction factor (1-k) and the other providing the correction factor k. Since k is a factor between 0 and 1, these two correction factors are referred to as complementary.

The factor (1-k) is supplied to one input of the multiplier stage 2 which is located in the television signal channel between the terminal 1 and the addition stage 3, while the factor k is supplied to the input of another multiplier stage 7, to the other input of which the delayed picture signal is supplied. The output of the first multiplier stage 2 is connected with one input of the addition stage 3 and the output of the second multiplier stage 7 is connected to a second input of the addition stage 3. The television signal with reduced noise is available from the output terminal 8 to which the output of the addition stage 3 is supplied.

The noise reducing system as so far described is a known system. In accordance with the invention, for use of noise reduction of this type with a source of television signals having variable television frame repetition, as in the case of a film scanner, for example, the circuit 6 for generating the correction factor is provided with further information, and means for responding thereto—information regarding the television frame repetition index. Accordingly, at the second input 10 of the circuit 6, there are provided, over a multi-wire cable the outputs N of a selection circuit 9 for controlling the choice between various available film speeds of a film scanner (not shown) supplying signals to the terminal 1. Such film speeds would typically include, for example, 50 frames per second, 25 frames per second, 12.5 frames per second and 6.25 frames per second. The switch 11 makes possible the selection of the desired film speed in the unshown film scanner and at the same time the provision of corresponding information to the circuit 6 for change of the correction factor k by subcircuits 6' controlled by the switch 11.

The lower the film speed is, which means the larger the number of repetitions of each television frame, the greater the correction factor k and likewise also the component of the television signal issuing from the delay unit 4 supplied through the addition circuit 3 to the output signal available at the terminal 8.

It has been found advantageous for the case of very low film speeds, which is to say in the case of multiple read-out of the television frame from the delay unit 4, to set the factor k to the value 1, so that the output signal at the terminal 8 is delivered only from the output of the delay unit 4. With this recirculation of the picture signal, the noise reduction is not deteriorated by correlated input noise.

Figure 2:
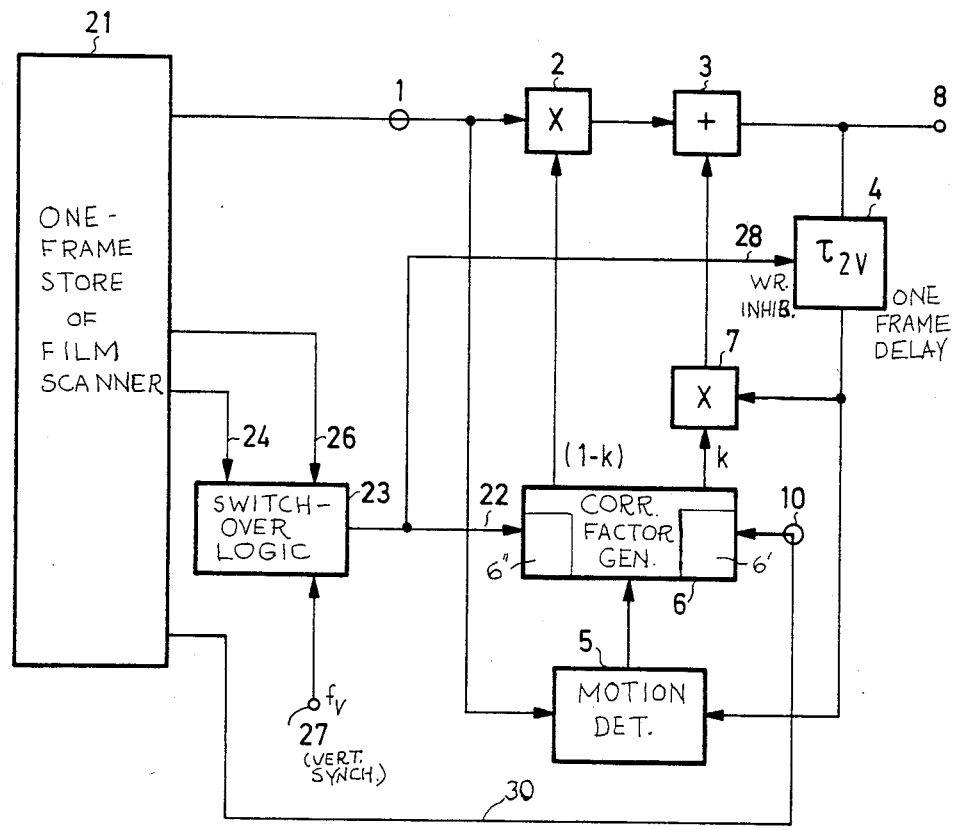
FIG. 2 is a block circuit diagram of a noise-reduction system of the invention in combination with a source of picture signals of variable frame repetition pattern.

FIG. 2 shows the noise-reduction circuit of FIG. 1 in combination with the parts essential for explanation of the invention which belong to a television picture source, the rest of which is not shown in the drawing. Components of the circuit of FIG. 2, which are the same as those of FIG. 1, are designated by the same reference numerals.

The picture store 21 is the picture store of a variable repetition television signal source, for example a film scanner. The television signal to be processed for noise reduction is supplied over the terminal 1 to the noise reducer composed of the components 2-7 and the noise-reduced television signal is made available at the output 8 of the latter circuit. There is also a connection 30 between the picture store 21 and terminal 10 and circuits 6' of the circuit 6 for changing the normal value of the correction factors k and (1-k) in the case of slow motion pictures or the like.

The input 22 of the circuit 6 operates on a portion 6" of the circuit 6 for switching the correction factor k and its complement from one value to another as set forth further below. The input 22 receives switchover signals from the switchover logic circuit 23 to which at a first input 24 a signal is supplied from the picture store 21 providing a signal indicating the change of picture frame content, which is to say, in the case of a film scanner, the change from one frame to the next in a film being scanned. A second input 26 of the logic circuit 23 supplies a signal indicating the beginning of repetion of the read-out of a frame stored in the picture store.

In this example a signal appears after the first two television fields have been read out from every frame newly stored in the store 21 and remains until the next frame is written in and ready to be read out. A third input 27 of the logic circuit 23 supplies the studio synchronizing pulses of the vertical scan frequency, so that the logic circuit 23 is synchronized with the field frequency of the television equipment. The output of the logic circuit 23 is connected with the blocking input 28 of the delay circuit 4, as well as with the input 2 of the circuit 6,6".

The operation of the circuit 6" in the illustrated case is to change the setting of the correction factor k from the value determined by the input terminal 10 and the circuit 6' to the value 1 in response to a signal from the output of the logic circuit 23. That signal at the same time blocks the writing-in of television signals in the delay circuit 4. In consequence, when there is repeated read-out of a television frame from the delay unit 4, the write-in blocking signal prevents writing-in of a recirculated picture into the delay unit 4 and thereby prevents the superposition of any supplementary correlated noise on the television signal.

Figure 3A:
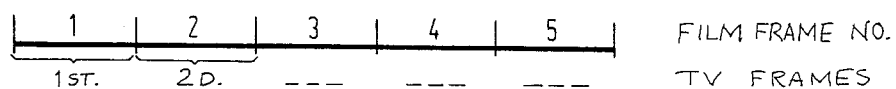
FIG. 3a is a timing diagram for the operation of the system of FIG. 2 for a film scanner operating at 25 frames per second in connection with a television standard of 625 lines and 25 frames per second.
Figure 3A:
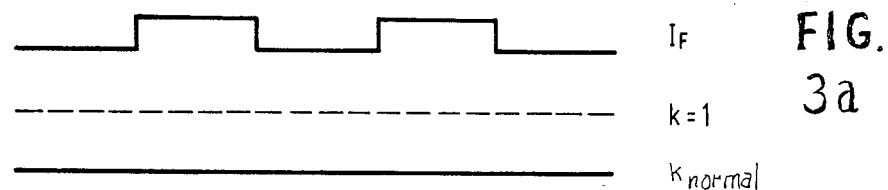
Figure 3B:
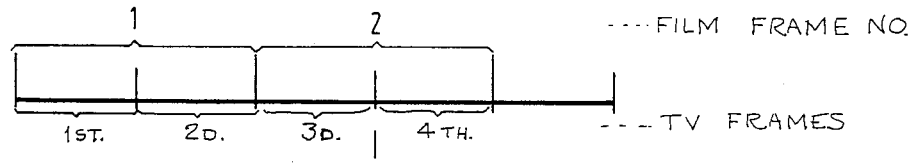
FIG. 3b is a timing diagram for the system of FIG. 2 operating with a film scanner working at 12.5 frames per second in connection with a television standard of 625 lines and 25 frames per second.
Figure 3B:
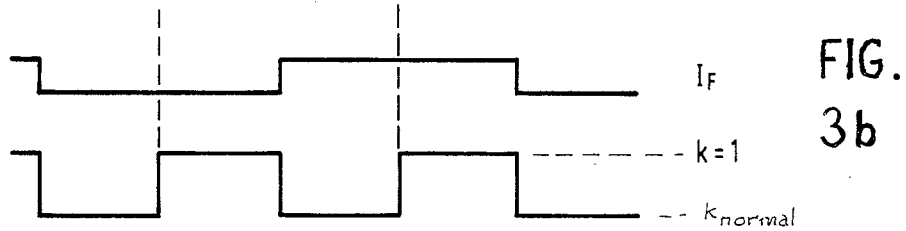
Figure 3C:
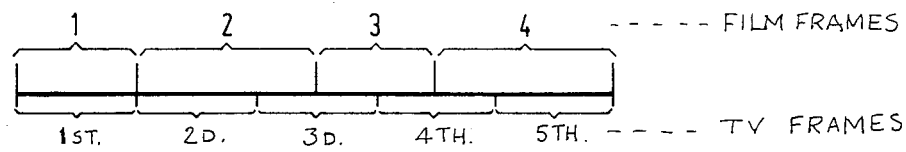
FIG. 3c is a timing diagram for the system of FIG. 2 operating with a film scanner working at 24 frames per second under a television standard of 525 lines and 30 frames per second.
Figure 3C:
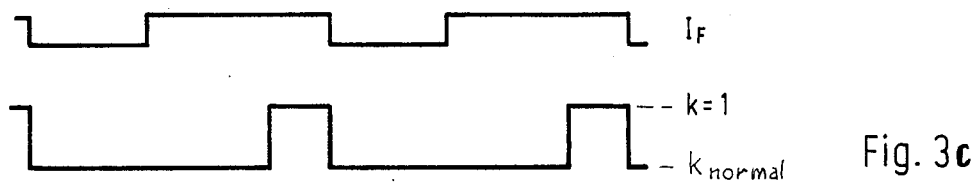

FIGS. 3a, 3b and 3c respectively represent three different possibilities of television reproduction of motion picture films with noise reduction in accordance with the present invention. The diagram given in FIG. 3a represents operation at a speed that is normal in Europe, namely 25 film frames per second, in accordance with the European television standard of 25 television frames per second. FIG. 3b shows a slow-motion reproduction with film scanning at 12.5 frames per second and television transmission in accordance with the European standard. FIG. 3c shows film getting at the normal USA rate of 24 frames per second and television transmission at the U.S. television standard of 525 lines and 30 television frames per second.

In FIG. 3a, the film frames to be reproduced in television are designated 1,2 . . . 5 in the first line of the diagram. They are scanned at a normal film speed of 25 frames per second and transmitted under a television standard of 625 lines per picture (frame) and 25 frames per second. In line 2 of FIG. 3a is shown the pulse signal $I_F$ provided at the input 24 of the logic circuit 23, which at the beginning of each film frame switches from one of its extreme values to the other. In this case the correction factor k as shown on line 3 always remains at the normal operation value.

FIG. 3b shows a film scanner operation of which two film frames designated 1 and 2 at the top of the diagram are shown in the diagram. Each one of these film frames is reproduced by two television frames, each made up of two fields. The duration of the film frame recognition pulses in line 2 is thereby doubled, so that there are two television frames between each transition of the signal $I_F$. In consequence, on the third line of the diagram, showing the correction factor k, the value of the correction factor k is switched from the operating value to the value 1 after the first full frame television scan of each film frame.

In FIG. 3c, a diagram is given showing four film frames in the reproduction of films at the normal speed of 24 frames per second with scanning at the American television standard of 525 lines per frame and 30 frames or 60 fields per second, requiring a different number of television scans of each successive film frame in a pattern of alternation. Thus, the film frame 1 is transmitted with two fields, whereas the film frame 2 is transmitted with three fields, and so on. The corresponding film frame change signal is again shown in line 2. As shown in line 3, there results the switching of the correction factor from the normal operation value to the value 1 every time at the beginning of the third television field in the scanning of each film frame.

It will be understood that although the invention has been described with reference to particular illustrative examples, variations and modifications are possible within the inventive concept.

We claim:

1. In a television noise reduction system comprising means for multiplying picture values of a picture signal composed of successive television frames by the complement (1-k) of a correction factor (k) in the range from 0 to 1, representative of an effective integration time constant for said picture point values, to produce a product signal, means for adding said product signal to a correlative delayed signal to produce a noise-reduced signal, means for delaying said noise-reduced signal by a television frame interval to produce a first delayed signal and for multiplying picture point values of said first delayed signal by said correction factor (k) to produce said correlative delayed signal, and means for detecting pictured movement by comparing said picture signal with said first delayed signal to produce an output signal indicative of the presence of picture movement, said picture signal being provided by a source of picture signals that is variable as to the number of times that a television frame is identically repeated in said picture signals, said number being possibly fractional for the case of repetition of an odd number of half-frames, the improvement which comprises:

means (23,30; 10,11) connected to said source of picture signals for producing a signal representative of said possibly fractional number of times of identical television frame repetition at which said source is operating, and means (6',6'') responsive to said repetition-representative signal for setting the value of said correction factor which is provided in said noise-reduction system in the absence of any signal indicative of the presence of picture movement at the output of means for detecting picture movement and for setting a predetermined value of said correction factor at least when said repetition-representative signal represents at least a predetermined number of frame repetitions.

2. Improvement according to claim 1, in which said means for setting the value of said correction factor is constituted so as to increase said correction factor (k) in response to a change in value of said repetition-representative signal signifying an increased repetition number and so as to decrease said correction value factor (k) in response to a change in values, said repetition-representative signals signifying a decreased repetition number.

3. Improvement according to claim 1, in which said correction factor value setting means comprise means for setting said correction factor value (k) at the value 1 in response to a value of said repetition-representative signal representing a number of repetitions of a television frame exceeding a predetermined number.

4. Improvement according to claim 3, in which said predetermined number is zero.

5. Improvement according to claim 4, in which said source comprises a storage unit (21) in which signals of each television frame are stored, and from which said picture values of said picture signal of said source are read out in the form of successive half-frames which alternate when repeated, and in which means are provided for activating said means for setting said correction value (k) at the value 1 in response to the reading-out of the first two of said half-frame picture fields from said storage unit following the storage of a television picture frame in said unit.

6. Improvement according to claim 5, in which a connection (28) is provided for blocking the storage of new signals in said delay unit (4) while said correction factor value setting means sets said correction factor (k) at the value 1.

* * * * *